United States Patent [19]

Neumeister

[11] Patent Number: 5,505,977

[45] Date of Patent: Apr. 9, 1996

[54] PROCESS FOR PREPARING BREAD PRODUCT CONTAINING HEAT-DENATURED EGG YOLK BASED MATERIAL

[75] Inventor: Dan A. Neumeister, Lincoln, Nebr.

[73] Assignee: Board of Regents of the University of Nebraska, Lincoln, Nebr.

[21] Appl. No.: 163,423

[22] Filed: Dec. 8, 1993

Related U.S. Application Data

[63] Continuation-in-part of Ser. No. 77,075, Jun. 10, 1993, abandoned.

[51] Int. Cl.$^6$ ........................................... A21D 6/00
[52] U.S. Cl. .................... 426/549; 426/558; 426/568; 426/653; 426/654
[58] Field of Search ........................ 426/549, 558, 426/568, 653, 654

[56] References Cited

U.S. PATENT DOCUMENTS

| | | | |
|---|---|---|---|
| 2,030,964 | 2/1936 | Clickner | 426/313 |
| 2,142,511 | 1/1939 | Harris et al. | 426/614 |
| 3,152,910 | 10/1964 | Sugihara et al. | 426/555 |
| 3,846,563 | 11/1974 | Cunningham | 426/158 |
| 3,935,324 | 1/1976 | Persmark et al. | 426/572 |
| 4,183,966 | 1/1980 | Mickle et al. | 426/42 |
| 4,217,369 | 8/1980 | Durst | 426/98 |
| 4,406,603 | 9/1983 | Williams | 425/191 |
| 4,469,711 | 9/1984 | Seltzer | 426/557 |
| 4,495,214 | 1/1985 | Seltzer et al. | 426/557 |
| 4,525,371 | 6/1985 | Blemlek | 426/557 |
| 4,540,592 | 9/1985 | Myer et al. | 426/557 |
| 4,650,690 | 3/1987 | Bams et al. | 426/602 |
| 4,697,507 | 10/1987 | Nagasaki | 99/483 |
| 4,834,996 | 5/1989 | Fazzolare et al. | 426/302 |
| 4,990,348 | 2/1991 | Spratt et al. | 426/242 |
| 5,063,072 | 11/1991 | Gillmore et al. | 426/557 |
| 5,094,859 | 3/1992 | Sluimer | 426/19 |
| 5,124,161 | 6/1992 | van Lengerich et al. | 426/94 |
| 5,124,168 | 6/1992 | McMillin et al. | 426/557 |
| 5,132,133 | 7/1992 | Huber et al. | 426/241 |
| 5,178,893 | 1/1993 | Seewi et al. | 426/549 |
| 5,178,894 | 1/1993 | Rudel | 426/549 |
| 5,283,075 | 2/1994 | Sonoike et al. | 426/549 |
| 5,344,663 | 9/1994 | Jewell et al. | 426/549 |

OTHER PUBLICATIONS

International Search Report for International Application No. PCT/US94/06595.

"Breadmaking; Its Principles and Practice," Edmund B. Bennion, Fourth Edition, Oxford University Press, New York, Toronto, 1967.

"Gelatinization of Corn Grits by Roll— and Extrusion–Cooking," R. A. Anderson, H. F. Conway, V. F. Pfeifer, and E. L. Griffin, Jr., Northern Regional Research Laboratory, Peoria, Illinois 61604.

Eastman Products for the Food, Pharmaceutical, and Agricultural Industries, Publication No. ZM–38C, Jun. 1985.

*Primary Examiner*—Donald E. Czaja
*Assistant Examiner*—Lien Tran
*Attorney, Agent, or Firm*—Merchant, Gould, Smith, Edell, Welter & Schmidt

[57] ABSTRACT

Bread dough and bread are prepared from non-bromate containing flour and heat-denatured egg-yolk material. The resulting product contains essentially no bromate residue and may contain reduced fat compared with other bread products having similar texture, appearance, volume and weight.

5 Claims, No Drawings

1

PROCESS FOR PREPARING BREAD PRODUCT CONTAINING HEAT-DENATURED EGG YOLK BASED MATERIAL

This application is a continuation-in-part application of U.S. patent application Ser. No. 08/077,075, filed Jun. 10, 1993 now abandoned.

FIELD OF THE INVENTION

The present invention relates to a bread dough composition, and more particularly to a bread dough composition prepared from non-bromate containing flour and heat-denatured egg-yolk. The present invention further relates to a cooked bread product prepared from such a bread dough composition and a process for the production thereof.

BACKGROUND INFORMATION

Bread manufacturers desire to work with bread dough having consistently good processing characteristics, particularly in automatic plants where stable dough facilitates handling and retains shapeliness in the loaves. Consumers demand bread products having a pleasing texture and internal crumb grain appearance. The texture and grain appearance must remain pleasing even after the bread sits for several days.

In order to ensure the consistent performance of flour and provide bread with a desired texture and internal crumb grain appearance, bread manufactures add mineral improvers to flour. Potassium bromate ($KBrO_3$) is regarded as the most powerful mineral improvers added to flour, and is typically added to flour at a level of 1 part per 100,000 parts of flour (1/10 oz. per sack). As a result, potassium bromate residues are found in several bread products, primarily rolls and specialty breads.

Recently, the use of bromates in food products has raised many health concerns. The United States Food and Drug Administration is presently considering whether to ban the use of bromates in foods. Several countries, including Canada and Great Britain, presently ban the use of bromates in baked foods. However, until now, no adequate natural substitute for potassium bromate has been discovered that imparts to the flour consistent processing characteristics and provides a bread product with a desirable texture and internal crumb grain appearance both immediately and several days after the bread is produced.

In addition to eliminating the use of bromates in bread products, consumers are rapidly becoming more health conscious and demand bread products having reduced fat content yet retaining the internal crumb grain appearance and texture of breads high in fat. Accordingly, it is desired to decrease the amount of shortening used in preparing bread products while retaining a desirable degree of internal crumb grain appearance and texture, even after the bread sits for several days.

SUMMARY OF THE INVENTION

Accordingly, one object of the invention is to prepare bread dough from non-bromate containing flour having consistently good processing characteristics.

A further object of the invention is to consistently manufacture bread having good crumb grain appearance and softness from flour containing no mineral improvers.

Another object is to produce bread free of potassium bromate and residues, and having good internal crumb grain appearance and softness even after sitting for several days.

Still another object of the invention to prepare reduced fat containing bread product having good internal crumb grain appearance and softness even after sitting for several days.

According to the present invention, the foregoing and other objects and advantages are attained by combining non-bromate containing flour with heat-denatured egg-yolk-based material. By combining non-bromate containing flour and heat-denatured egg-yolk-based material, it is additionally possible to reduce the amount of conventional shortening typically used in preparing bread and retain the internal crumb grain appearance and softness of bread high in shortening.

Additional objects, advantages and novel features of the invention will be set forth in part in the description which follows, and in part will become apparent to those skilled in the art upon examination of the invention.

DETAILED DESCRIPTION OF THE INVENTION

Bread dough and bread can be prepared within the scope of the present invention by generally following any known recipe, and by utilizing non-bromate containing flour and heat-denatured egg-yolk-based material. The bread can be yeast-leavened, chemically leavened, or unleavened. A skilled artisan will readily appreciate how the following ingredients can be used for producing dough and bread within the scope of the present invention.

Non-bromate containing flour is an important ingredient in practicing the present invention. The term "non-bromate containing flour" is meant to include flour containing essentially no potassium bromate. The flour should contain a significantly reduced amount of potassium bromate compared with conventionally available flour. Preferably, the non-bromate containing flour contains less than half of the potassium bromate present in other commercially available flour, more preferably less than 0.5 parts of potassium bromate per 100,000 parts of flour, more preferably less than 0.1 parts of potassium bromate per 100,000 parts of flour, and even more preferably less than 0.01 parts of potassium bromate per 100,000 parts of flour. In addition, the flour used in practicing the present invention should contain essentially no mineral improvers, or residues therefrom.

Although the flour used in practicing the present invention may contain essentially no bromate, the list of useable types of flours is practically unlimited. One skilled in the art of breadmaking will readily appreciate how factors such as the condition under which the dough and bread are produced and the properties sought for dough and bread effect the selection of a particular flour. For example, strong flours may be used when a long period of fermentation is acceptable for producing bulky bread. Some flours produce dough which are stodgy and soft like putty, without elasticity, and non-resistant to fermentation, but retain their shape and produce shapely bread. Other flours produce unstable runny dough, offering no resistance to fermentation and producing flat loaves. Accordingly, the flour should be selected based upon the desired properties of dough or bread prepared therefrom.

Exemplary flours which can be used for preparing dough and bread according to the present invention include all-purpose flour, cake flour, pastry flour, bread flour, gluten flour, whole-wheat flour, Graham flour, stone-ground flour, rye flour, pumpernickel flour, durum flour, semolina flour, triticale flour, self-rising flour, granulated flour, and mixtures thereof. Additional kinds and grades of flour may be used to obtain the desired texture, color and flavor of the product.

In addition to the non-bromate containing flour component, bread dough and bread prepared according to the present invention must contain a necessary amount of heat-denatured egg-yolk-based material. As will be described below, the heat-denatured egg-yolk-based material must be present in an amount sufficient to impart desired processing characteristics, texture, appearance, and the like to bread dough or bread, and preferably is not present in an amount significantly greater than that necessary to impart the above desired properties. However, the upper limit of heat-denatured egg-yolk-based material may be based upon considerations of fat content of bread produced therefrom and cost of the material. In addition, too much of the egg-based material would impart an "egg-like" taste, which may not be desirable.

The heat-denatured egg-yolk-based material is also referred to as "heat-denatured egg-yolk-based emulsifier" (HDEYE). The HDEYE can be used as a whole or partial replacement for the emulsifier component typically used in preparing bread or can be used in addition to emulsifying ingredients depending on the desired properties of the resulting dough and bread. For example, HDEYE can be used as a replacement for an emulsifier such as glycerol monostearate in an amount sufficient to impart desirable characteristics to the dough and bread prepared therefrom. Such characteristics include sensory evaluations by touch and sight. For example, the wetness, texture and workability of dough can be altered by the amount of HDEYE incorporated therein. Furthermore, properties of bread such as volume, weight, appearance and crumb grain, texture and color can be affected by the amount of HDEYE used in preparation. High amounts of HDEYE tend to improve crumb softness after several days storage.

The amount of HDEYE used according to the present invention is dependent on the product made, the other ingredients present and the manufacturing conditions. An effective amount of HDEYE is used to produce a product with desired properties. The factors that determine the proper level of use are similar to those for the application of other nonegg-yolk-based emulsifiers, even though the absolute amount of emulsifier used may be different.

Generally, a person would perform routine and usual testing to determine an appropriate amount of an emulsifier to be used for a particular product to be made under a certain set of manufacturing conditions in a particular application. The testing can also be done using a conventional emulsifier to establish operating conditions before the egg-yolk-based emulsifier is used. To do so allows direct comparison of the emulsifier under identical (except for emulsifier) conditions. The level of incorporation of the egg emulsifier in the manufacture of a bread dough or bread is adjusted to be consistent with attaining a certain desired property, e.g., improved organoleptic characteristics, reduced stickiness to prevent clumping, reduced syneresis, proper texture, decreased or delayed retrogradation, increased expansion, and the like.

All percentages in this disclosure are weight percents of total dry ingredients unless otherwise indicated. Preferably, at least 0.01% HDEYE is incorporated into bread dough based on a dry ingredient weight basis. More preferably 0.05 to 20.0% HDEYE is used, even more preferably 0.1 to 5% HDEYE is used, and most preferably 0.3 to 2.0% HDEYE is used.

Methods for preparing HDEYE are described in detail in U.S. patent application Ser. No. 08/075,046, filed Jun. 10, 1993, incorporated herein by reference. Any raw material can be used in making the heat-denatured product so long as after the denaturing process the product is capable of imparting characteristics such as consistent processability to bread dough and desirable texture and appearance to bread, wherein the bread dough and bread contain essentially no bromate residues. Preferably, the heat-denatured material should be capable of being used as an emulsifier for facilitating the desired smooth processing characteristics of bread dough. Preferably, egg, egg-yolk, or combinations of whole egg and egg-yolk are heat-denatured under conditions sufficient to render it suitable for use in the present invention. Most preferably, egg-yolk is used. Typically, a liquid egg product is well mixed before heat-denaturing.

Liquid whole egg and liquid egg-yolk are commercially available. Such materials are suitable for making emulsifier used in the present invention. Spray-dried egg and egg-yolk are also commercially available. In the conventional spray-drying of egg products, great care is taken to keep the dryer temperature at a level that will not denature proteins. However, HDEYE is prepared by deliberately selecting a temperature so as to denature the protein.

Normally, egg or egg-yolk contains water which is removed to prevent spoilage of the product. This drying process may be a separate step or may be incorporated into the heat denaturing process. Commercially available dried egg can also be utilized to produce the emulsifier. The whole egg or egg-yolk may be dried first, and then subsequently heat-denatured, optionally with a different dryer. In such a case, a liquid egg product is pre-dried to a non-flowable solid form, and then heat-denatured to obtain the desired emulsifying properties. Preferably, liquid whole egg or egg-yolk may be spray-dried first, and then further treated in an oven to obtain the desired emulsifier properties.

The heat-denaturing can be accomplished as a continuous technique or in stages. The egg may be partially denatured in one oven and later further denatured in another oven. The egg-yolk or whole egg may be heat-denatured to render it effective as an emulsifier before further drying. However, a preferred processing sequence is simultaneous drying and heat-denaturing. The heat-denaturing and/or drying can be done with any conventional means for drying. For example, convention dryers such as tray dryers, reel dryers, rotary dryers, spray-dryers, flash dryers and the like may be used.

The parameters for the heat-denaturing/drying conditions are selected so that the proteins in the egg-yolk are denatured to an extent such that the heat-denatured egg product is effective to reduce clumping and provide consistent and desirable processing characteristics of the dough and to provide desirable final properties of appearance, texture, color, volume and weight of the bread. Too much charring of the egg may be undesirable. Preferably, the heat-denatured egg-yolk-based material contains a denatured protein level of at least 5%. Accordingly, the denatured protein level is preferably between 5 and 95%, more preferably between 10 and 95%, and even more preferably between 15 and 90%. Ideally, the level of denatured protein is between 60 and 80%.

A factor that affects the selection of the heating time and temperature in the heat-denaturing process is the moisture content of the starting material. Typically, a higher moisture content requires longer heating time and more air flow. Oven type dryers such as tray dryers and rotary dryers are effective in drying solid products.

The heat-denaturing step generally takes up to about 48 hours, preferably 10 to 48 hours although longer or shorter period of heating time may be used. The heating time will also depend on the mechanics of the heating operation and the desired extent of denaturing. For example, if only a very thin layer of an egg-yolk-based material is heated in an oven, the heating time may be significantly less than 10 hours, possibly 1 hour, or even a few seconds. Preferably, the heat-denaturing time is less than 24 hours, although if desired, a heating time of much longer than 100 hours may be employed. The heating temperature in the oven is typically about 65° C. to about 205° C. (150° to 400° F.), and preferably about 70° C. to about 150° C. (160° to 300° F.). Although a temperature higher than about 205° C. (400° F.) may possibly be used, it is not preferable because of the risk of charring. The heating time and temperature may be adjusted depending on the other parameters selected.

Liquid egg or egg-yolk can also be heat-denatured by subjecting it to heating in a medium such as a boiling liquid. For example, liquid egg-yolk can be placed in a container which is placed in boiling water. The container acts as a heat exchanger in heating the egg-yolk material. Obviously, other liquids, for example, oil can be used as the liquid heating medium. An important factor in the selection of such heating method is temperature. Other variations of a heating method using a heat exchanger include heating with steam and heating a heat exchange device such as a scrapped-film heat exchanger or a drum dryer. In such instances, a temperature of about 65° C. to about 150° C. (150° to 300° F.) is adequate. The preferred temperature is about 90° C. to about 100° C. (195° to 230° F.). The resultant heat-denatured product can have moisture content of more than 10 wt-%. Generally, a substantially dry emulsifier can be mixed with other dry ingredients more efficiently than a moist emulsifier. To improve the functionality as an emulsifier and to obtain longer shelf life, it is preferable to reduce the water content of such a product to less than 10 wt-%, and more preferably to about 5–7 wt-%. To this end, drying method such as freeze drying, oven drying, air drying, etc. can be used.

Further, it has been found that heat-denatured material of a suitable emulsifying character can be produced by heat spray-drying, which affords heating time in the range of fractions of a second to seconds. Dryers such as spray-dryers or flash-dryers are suitable for simultaneously drying and heat-denaturing liquid egg or egg-yolk. If a spray-dryer is used, typically the outlet temperature of the spray-dryer is from about 65° C. to about 125° C. (150° to 255° F.), but may be even higher. The preferable outlet temperature is from about 70° C. to about 105° C. (160° to 220° F.). Drying equipment and operation are discussed in *Perry's Chemical Engineers' Handbook*, Section 20: Gas-Solid Systems, McGraw-Hill, 5th Ed., which is incorporated by reference herein.

To produce a substantially dry emulsifier, water is removed from the egg-yolk-based material in the drying process. Generally, air is circulated to remove the moisture and facilitate drying. In heat-spray drying or flash-drying, large volumes of hot air are forced through the dryer to heat the emulsifier and remove the moisture. The air flow rate can vary widely depending on the dryer type, the temperature selected, the humidity of the air, the ambient air temperature, the water content of the dryer feed, etc. In general, for a typical spray-dryer, the typical air flow is about 85 to about 130 $M^3$/M per Kg of dryer feed, and preferably about 95 to about 110 $M^3$/M per Kg of dryer feed when the dryer feed is liquid egg-yolk. By varying some of the aforementioned variables, air flow rates outside these ranges can also be suitable.

In heat-denaturing by oven-drying, the starting egg-based emulsifier material is generally relatively low in moisture and air circulation is of less importance than in spray-drying and flash-drying. However, air flow, whether heated or not, can be used to remove water vapor evaporated from the heat-denaturing eggs. For a starting material such as spray-dried egg-yolk, the heating-denaturing can be done in an oven dryer with no special provision of air flow. Heat-denaturing can also take place in a device where the heating medium is hot air. Depending on the moisture content of the starting material, the type of oven used, the temperature selected, etc., the rate of air flow can vary greatly. An example is the heat-denaturing of spray-dried egg-yolk with a convection oven. The air flow is typically about 0 $M^3$/M per $M^3$ of dryer volume to 28 $M^3$/M per $M^3$ of dryer volume.

After oven heat-denaturing or spray-drying heat-denaturing, the egg-yolk-based emulsifier will typically be substantially dry, having a moisture content to 2 wt-% to about 7 wt-%. Often, the moisture level in the emulsifier is less than 5 wt-% after such heat-denaturing processes. Of course, the egg-yolk-based emulsifier can absorb moisture, either from the environment or from other materials added during the processing of the final product. Generally, such a post-heat-denaturing increase in moisture will not affect the emulsifying property of the product.

If desired, heat-denatured egg-yolk-based emulsifier (HDEYE) can be stored at refrigeration temperature or freezing temperature for preserving the product against spoilage. Refrigerated storage is generally at about 0° C. to about 5° C. (32° to 40° F.). Storage can also be in a freezer at a temperature lower than 0° C. (32° F.).

The heat-denatured egg-yolk-based emulsifier (HDEYE) can be used, if desired, in place of or in conjunction with a conventional emulsifier and still achieve a desired emulsifying effect in food processing and/or a desired characteristic in the resulting bread product. By using HDEYE in place of a conventional emulsifier or in combination therewith, it is possible to produce dough and bread having desirable properties at a lower fat content. Although HDEYE can contain about 50% fat, very little of it is needed. Therefore, when HDEYE is used in place of all or part of another emulsifier, much less fat is needed to achieve the equivalent properties of properties such as wetness, workability, softness, crumb grain appearance and texture, weight, volume and color. Routine and usual testing can be performed as discussed above to determined the most advantageous mixture of HDEYE and conventional emulsifier to achieve the desired result.

In conventional processes of making bread products, commonly used emulsifiers include glycerol monostearate, monoglycerides, diglycerides, ethoxylated monoglycerides, sodium stearoyl-2-lactylate, succinylated monoglycerides, lecithin, sorbitan stearates, polysorbates and the like, and combinations thereof. For example, a commercially obtainable complexing compound that can be used as an emulsifier is a monostearate mixture, "PANIPLEX™" (ADM Arkady Olathe, Kans.). Emulsifiers containing glycerol monoglyceride, "MYVAPLEX600™," and "MYVATEX™" are commercially available from Eastman Chemical Products, Kingsport, Tenn. These commercially available emulsifiers are generally derived from vegetable oils.

The present inventors believe the combination of non-bromate containing flour and heat-denatured egg-yolk-based material is primarily responsible for providing the dough composition with desirable processing characteristics similar to dough prepared using bromated flour, and for providing the resulting bread with a texture and crumb grain similar to breads prepared using bromated flour. In addition, the absence of shortening as an ingredient in a bread composition prepared from unbromated flour and heat-denatured egg-yolk-based emulsifier provides an improved texture and crumb grain.

Although the application of this invention is not bound by any theory, it is believed that heating the egg-yolks under the specified conditions denatures some of the protein in the egg-yolk, thereby changing their functional properties. The molecular structures of the proteins are believed to be uncoiled by the process which allows the proteins to interact, or complex with the other ingredients of the bread product.

Additional raw materials for preparing bread include yeast or a chemical leavening agent such as baking powder, salt, sugar, water, malt, milk and fats. Typically, these and additional ingredients for preparing bread can be used for their recognized purposes. By following typical and usual understanding concerning bread ingredients, the amount of these ingredients can be adjusted as desired to obtain a desirable product.

Any type of yeast would be useful in the present invention, including fast-, medium-, and slow-working yeast. However, fast-working yeast is most suitable for breadmaking because of its ability to cause rapid fermentation at high temperatures. Slower-working yeast such as those typically used in brewing and distilling can, when desired, be used for breadmaking. One skilled in breadmaking will readily appreciate the type of yeast to be used to achieve a desired result.

Chemical leavening agents such as baking powder and the like can be used in preparing bread according to the present invention. Breads prepared using a chemical leavening agent are generally referred to as quick breads because they do not require a fermentation period and can be made up into the desired product as soon as the dough is mixed. Typically, quick breads are denser, have a coarse grain and crumbly texture. Corn bread and baking-powder biscuits are typical examples of chemically leavened quick breads.

Water is an important ingredient in bread. Water helps the mixing of the solid ingredients and the plasticizing of the solid ingredients. One would readily appreciate the amount of water necessary to prepare bread according to the present invention.

Any of the standard salts used in breadmaking can be used in practicing the present invention. In addition to common salt, or sodium chloride, other salts containing phosphates, magnesium carbonate and/or sodium iodide can be used. Generally, the salt functions to give flavor to the bread, to confer "bloom" (wholesome appearance) on the finished loaf, to tighten up and give stability to the gluten of the flour and thereby enable a bold loaf to be produced with a firm cutting crumb, to prevent yeast from working to fast, and to help keep the loaf moist after withdrawal from the oven. Accordingly, one will readily appreciate the type and amount of salt which can be used in practicing the present invention.

Any of the known malts can be used in practicing the present invention. Exemplary malts include brown malt, amber or pale malt, malt flour, malt extract and dried malt extract. The quantity of malt to be used in a dough depends on the desired properties of the dough and bread, the maltose figure of the flour, the strength of the malt and the type of bread being produced. For example, low or medium diastatic malts are preferred for white breads, and non-diastatic or low diastatic malts are preferred for brown breads. The malt tends to supplement natural deficiencies of sugar in flour, provides food for yeast, assists in ripening glutinous flours, improves bloom and general appearance of bread, imparts softness to the crumb of the bread, and improves the keeping qualities of the bread.

Any type of milk product can be used in practicing the present invention. Exemplary milk products include fresh whole milk, fresh skimmed milk, separated powder milk, full-cream powder milk, specially enriched powder milt, sweetened condensed milk, and evaporated milk. The milk product can be derived from any source desired. The type and amount of milk should be selected based upon the properties desired for the dough or bread product. Milk is typically used to confer a delicate flavor on the bread crumb, to improve the bloom and color of the bread, assist in producing a thin biscuit-like crust, to improve the texture and sheen of the crumb, and to increase the mineral content of bread. In addition, powdered skimmed milk enables the flour to take up more water, thereby providing a softer dough which can be more easily worked.

Any of the known sugars can be used as desired in practicing the present invention. Typically, sugar is used to improve the color and bloom of bread. Usually, the flour naturally contains enough sugar for the yeast. The amount and type of sugar used depends on the properties sought for the final product. Exemplary sugars include cane sugar, icing sugar, invert sugar, fondant, golden syrup, honey and black teacle.

As discussed above, shortening including animal oils and fats and vegetable oils may be added as a component of bread. Typically, they are used to increase volume and to improve crumb grain by providing a soft, even-texture. Often the shortening is added in an amount of 0.5%–1% based on weight of flour. However, the amount of shortening used in practicing the present invention depends on the amount of heat-denatured egg-yolk-based material used and the desired characteristics of the resulting dough and bread.

Additional components can be used while practicing the present invention based upon their known purposes.

The invention will be further described with reference to the following specific examples which are not intended to limit the scope of invention.

EXAMPLES 1–23

Bread loaves were prepared from 100 parts commercial white pan bread flour having a 14% moisture level (14% mb) and the following ingredients which are expressed as a percent of flour weight unless otherwise stated:

| Ingredients | |
|---|---|
| Water | 60+ |
| Sugar | 6 |
| Yeast | 3 |
| Salt | 1.5 |
| Shortening | 3 |
| Milk | 3 |
| Malt | 0.25 |

Additional water was added during the first 2 minutes of mixing to optimum absorption as determined by observation. Water absorption for the flour was kept between 63% and 65%.

Yeast is instant active dry yeast (IADY) sold under the trade name FERMIPAN™. The amount of IADY used is determined by volume and provides baking results equivalent to the use of 3% compressed yeast. The actual weight of IADY is 1.9 grams.

Shortening is a vegetable shortening sold under the trade name CRISCO™, and is added by volume.

Milk is nonfat dry milk.

Malt is added as a dispersed mixture in water.

Potassium bromate and/or heat-denatured egg-yolk emulsifier (HDEYE) were added only to certain bread loaves indicated in Tables 1 and 2, wherein the amount present in the bread loaves is provided. The potassium bromate was added as a water mixture and was present at levels of 5 ppm and 10 ppm. The HDEYE was present at levels of 0.5%, 1.0%, and 1.5%.

Procedure For Preparing Bread Loaves:

Yeast and flour are mixed for 30 seconds prior to the addition of other ingredients. The time spent mixing yeast and flour is not included as part of the bake mix time identified in Tables 1 and 2. The remaining components are added thereto. The sugar and salt are added in solution, the shortening is melted, the nonfat dry milk is added as a solid, malt is added as a dispersed mixture in water, potassium bromate, when added, is in a water mixture, and HDEYE, when added, is in powder form.

A 200 g flour weight dough is mixed in a National Manufacturing Co. pin-type mixer to optimum dough development as determined by observation and dough feel.

The dough is divided into two parts of equal weight. Each dough piece is rounded and placed into a metal fermentation pan previously coated with a small amount of CRISCO™. The pan is placed in a National Manufacturing Co. fermentation cabinet at 86° F. and 85%RH.

After 105 minutes the dough is punched using a National Manufacturing Co. sheeter set at 9/32 inch, hand rolled into a cylinder, and returned to the fermentation pan which is placed in the fermentation cabinet.

After 50 minutes the dough is sheeted, hand rolled into a cylinder, placed in the fermentation pan and returned to the fermentation cabinet.

After 25 minutes the dough is sheeted, hand rolled into a cylinder, placed into a bread pan, and returned to the fermentation cabinet.

The dough is proofed to height (93 mm). This usually takes 50–55 minutes. If the dough is not proofed to height in 75 minutes, it is placed in the oven.

The loaf is placed onto a National Manufacturing Co. reel-type oven that contains a pan of water, baked for 25 minutes at 425° F., removed from the oven and cooled.

At each baking, a control loaf is prepared.

Bread Evaluation:

After a loaf is cool to the touch, the loaf volume is determined by rape seed displacement. The loaf is then placed in a plastic bag which is sealed in a plastic box with a tight fitting lid.

The loaves prepared in Examples 1–9 were allowed to sit until the following morning, at which time they were removed from the box and sliced along the long axis with an electric knife. The external appearance and crumb grain and texture were evaluated by visual and textural comparison. The results of the evaluation are presented in Table 1.

The loaves prepared in Examples 10–23 were allowed to sit for five days, at which time they were sliced and evaluated similarly. The results of the evaluation are presented in Table 2.

The loaves were evaluated by a two member panel on a 13-step scale ranging from Very Poor, Very Poor+, Poor–, Poor, Poor+. Good–, Good, Good+, Very Good–, Very Good, Very Good+, Excellent–, Excellent. The control is evaluated first and the test loaves are evaluated against the control, i.e., "how much better" or "how much worse". The evaluation is based on touch and visual perception of each characteristic.

TABLE 1

Bread Evaluation After Sitting Overnight

| EXAMPLE | WATER ABSORPTION % | BAKE MIX TIME min. | ADDITIVES HDEYE LEVEL % | BROMATE LEVEL ppm | LOAF VOLUME cc | LOAF WEIGHT g | BREAD EVALUATION EXTERNAL APPEARANCE | CRUMB GRAIN | CRUMB TEXTURE | CRUMB COLOR |
|---|---|---|---|---|---|---|---|---|---|---|
| A) Effect of Bromate without BDEYE ||||||||||
| 1 (control) | 65 | 6.0 | 0.00 | 0 | 945 | 141.9 | Good– | Good– | Good– | |
| 2 | 65 | 6.3 | 0.00 | 5 | 955 | 142.0 | Fair | Good | Good | |
| B) Effect of HDM without Bromate ||||||||||
| 1 (control) | 65 | 6.0 | 0.00 | 0 | 945 | 141.9 | Good– | Good– | Good– | |
| 3 | 65 | 6.2 | 0.50 | 0 | 973 | 142.2 | Good– | Good | Good | |
| 4 | 65 | 6.0 | 1.0 | 0 | 990 | 139.3 | Good– | Good | Good | Sl. Yellow |
| 5 | 65 | 6.2 | 1.50 | 0 | 963 | 142.3 | Good | Good+ | Good+ | Sl. Yellow |
| C) Effect of HDEYE and Bromate ||||||||||
| 2 | 65 | 6.3 | 0.00 | 5 | 955 | 142.0 | Fair | Good | Good | |
| 6 | 65 | 6.0 | 0.50 | 5 | 938 | 142.4 | Good | Good | Good– | |
| 7 | 65 | 6.0 | 1.00 | 5 | 968 | 142.0 | Fair+ | Good+ | Good+ | Sl. Yellow |
| 8 | 65 | 6.2 | 1.50 | 5 | 968 | 142.4 | Fair+ | Very Good– | Very Good– | Sl. Yellow |

TABLE 1-continued

Bread Evaluation After Sitting Overnight

| EXAMPLE | WATER ABSORPTION % | BAKE MIX TIME min. | ADDITIVES HDEYE LEVEL % | BROMATE LEVEL ppm | LOAF VOLUME cc | LOAF WEIGHT g | BREAD EVALUATION EXTERNAL APPEARANCE | CRUMB GRAIN | CRUMB TEXTURE | CRUMB COLOR |
|---|---|---|---|---|---|---|---|---|---|---|
| D) Effect of HDEYE without Shortening ||||||||||||
| 1 (control) | 65 | 6.0 | 0.00 | 0 | 945 | 141.9 | Good– | Good– | Good– | |
| 9 | 65 | 6.0 | 1.50 | 0 | 922 | 142.0 | Good– | Very Good | Very Good | Sl. Yellow |

TABLE 2

Bread Evaluation After Sitting 5 Days

| EXAMPLE | WATER ABSORPTION % | BAKE MIX TIME min. | ADDITIVES HDEYE LEVEL % | BROMATE LEVEL ppm | LOAF VOLUME cc | LOAF WEIGHT g | BREAD EVALUATION EXTERNAL APPEARANCE | CRUMB GRAIN | CRUMB TEXTURE | CRUMB COLOR |
|---|---|---|---|---|---|---|---|---|---|---|
| A) Effect of Bromate without HDEYE ||||||||||||
| 10 (control) | 64 | 6.5 | 0.0 | 0 | 943 | 140.7 | Fair– | Good– | Poor+ | |
| 11 | 64 | 6.5 | 0.0 | 5 | 935 | 140.1 | Fair– | Good | Fair– | |
| 12 | 64 | 6.7 | 0.0 | 10 | 905 | 139.5 | Poor+ | Fair+ | Poor | |
| B) Effect of BDEYE without Bromate ||||||||||||
| 13 (control) | 64 | 6.3 | 0.0 | 0 | 975 | 141.5 | Fair | Good– | Poor+ | |
| 14 | 64 | 6.5 | 0.5 | 0 | 958 | 141.0 | Fair | Good– | Poor+ | |
| 15 | 64 | 6.2 | 1.0 | 0 | 980 | 141.1 | Fair+ | Good– | Fair– | Sl. Yellow |
| 16 | 64 | 6.5 | 1.5 | 0 | 960 | 139.9 | Fair | Good | Fair– | Sl. Yellow |
| C) Effect of HDEYE without Shortening ||||||||||||
| 17 (control) | 64 | 6.7 | 0.0 | 0 | 965 | 140.5 | Fair | Good | Fair– | |
| 18 | 64 | 6.2 | 0.0 | 0 | 805 | 139.2 | Poor | Fair | Poor | |
| 19 | 64 | 6.3 | 0.5 | 0 | 815 | 138.1 | Poor | Fair– | Poor | |
| 20 | 64 | 6.2 | 1.0 | 0 | 888 | 137.3 | Fair | Good– | Poor+ | Sl. Yellow |
| 21 | 64 | 6.2 | 1.5 | 0 | 945 | 139.5 | Fair | Good– | Fair– | Sl. Yellow |
| D) Effect of 1.5% Spray Dried Egg Yolk without Shortening ||||||||||||
| 22 | 64 | 6.5 | 0.0 | 0 | 950 | 139.4 | Fair | Good– | Poor+ | Sl. Yellow |
| E) Process Control ||||||||||||
| 23 (control) | 63 | 6.7 | 0.0 | 0 | 1000 | 140.3 | Fair+ | Good | Poor | |

As demonstrated by the data in Tables 1–2, loaf volumes appeared to be greatest at 1.0% HDEYE; bread scores for internal crumb grain and texture improved as the level of HDEYE increased; internal bread crumb color was slightly yellow with the addition of 1.0% and 1.5% HDEYE; the addition of 5 ppm bromate with HDEYE improved the internal bread scores over breads with only HDEYE; when 3.0% shortening in the formula was replaced by 1.5% HDEYE, the best scores were obtained; and increasing levels of HDEYE improve crumb softness for bread tests for crumb texture after five days storage in plastic bags at room temperature.

Obvious modifications or variations are possible in light of the above teachings. The above embodiments were chosen and described to provide the best illustration of the principles of the invention and its practical application to thereby enable one of ordinary skill in the art to utilize the invention in various embodiments and with various modifications as are suited to the particular use contemplated. All such modifications are variations within the scope of the invention as determined by the appended claims when interpreted in accordance with the breadth to which they are fairly, legally and equitably entitled.

What is claimed is:

1. A process for preparing yeast leavened bread essentially free of potassium bromate or residue thereof, comprising mixing non-bromate containing flour, water, yeast, and 0.1% to 5.0% by weight, based on a dry weight basis, of heat-denatured egg-yolk-based material, wherein said heat-denatured egg-yolk-based material is obtained from liquid egg yolk and has a level of denatured protein in excess of 5%.

2. The process according to claim 1, wherein yeast, water and milk are added to prepare bread.

3. The process according to claim 1, wherein the heat-denatured egg-yolk-based material is produced by oven-heating, spray-drying, or heating in a heat exchanger and drying.

4. The process according to claim 1, wherein the resulting bread contains essentially no potassium bromate, mineral improvers, or residue thereof.

5. The process according to claim 1, wherein the heat-denatured egg-yolk-based material contains a level of denatured protein in the range of 10–95%.

* * * * *